United States Patent
Power, II et al.

(10) Patent No.: US 11,623,109 B2
(45) Date of Patent: Apr. 11, 2023

(54) SUPPORT HARNESS WITH SHOCK REDUCING ELEMENTS

(71) Applicant: Tethrd LLC, Carver, MN (US)

(72) Inventors: Walter Ernest Power, II, Jordan, MN (US); Gregory Alan Godfrey, Richmond Hill, GA (US); Carl Eugene Kossuth, III, Jordan, MN (US)

(*) Notice: Subject to any disclaimer, the term of this patent is extended or adjusted under 35 U.S.C. 154(b) by 547 days.

(21) Appl. No.: 16/590,527

(22) Filed: Oct. 2, 2019

(65) Prior Publication Data

US 2021/0101032 A1    Apr. 8, 2021

(51) Int. Cl.
| | |
|---|---|
| *A62B 35/04* | (2006.01) |
| *A62B 35/00* | (2006.01) |
| *A01M 31/00* | (2006.01) |

(52) U.S. Cl.
CPC .......... *A62B 35/04* (2013.01); *A62B 35/0012* (2013.01); *A01M 31/00* (2013.01)

(58) Field of Classification Search
CPC . A62B 35/04; A62B 35/0012; A62B 35/0025; A62B 35/0031; A62B 35/0037; A62B 35/0075; A01M 31/00; A01M 31/02
See application file for complete search history.

(56) References Cited

U.S. PATENT DOCUMENTS

| | | | | |
|---|---|---|---|---|
| 3,804,698 A * | 4/1974 | Kinloch | .......... | F16F 7/12 |
| | | | | 428/176 |
| 5,067,585 A * | 11/1991 | Bell | .......... | A62B 35/0012 |
| | | | | 182/7 |
| 5,228,412 A * | 7/1993 | Bell | .......... | A62B 35/0025 |
| | | | | 182/3 |
| 6,390,234 B1 * | 5/2002 | Boyer | .......... | A62B 35/0018 |
| | | | | 182/3 |
| 7,909,137 B2 * | 3/2011 | Green | .......... | A62B 35/04 |
| | | | | 182/3 |
| 8,322,488 B2 * | 12/2012 | Green | .......... | A01M 31/02 |
| | | | | 182/3 |
| 9,808,659 B2 * | 11/2017 | Chevalier | .......... | A62B 35/04 |
| 10,016,633 B2 * | 7/2018 | Perner | .......... | A62B 35/0012 |
| 11,198,027 B2 * | 12/2021 | Green Mullins | .. | A62B 35/0075 |
| 2008/0179136 A1 * | 7/2008 | Griffith | .......... | A62B 35/04 |
| | | | | 182/5 |

FOREIGN PATENT DOCUMENTS

| | | | | |
|---|---|---|---|---|
| DE | 4224334 A1 * | 1/1994 | ......... | A62B 35/0018 |
| EP | 2353657 A1 * | 8/2011 | ......... | A62B 35/0018 |

* cited by examiner

*Primary Examiner* — Colleen M Chavchavadze

(57) ABSTRACT

A support harness with shock reducing elements includes a saddle with a first lateral edge and a second lateral edge. A pair of bridge connectors is attached to and extends outwardly from the saddle. The first and second lateral edges each has one of the bridge connectors positioned adjacent thereto. The bridge connectors each include a first strap section secured to the saddle adjacent to an upper edge thereof, a second strap section secured to the saddle adjacent to a lower edge thereof, and a central strap section extending between the first and second strap sections. The first strap section includes a plurality folds therein. A break-away fastener extends through the folds and breaks to release the plurality of folds when a predetermined amount of force is placed on the first strap.

6 Claims, 5 Drawing Sheets

SUPPORT HARNESS WITH SHOCK REDUCING ELEMENTS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to felt shock load reducing harness devices and more particularly pertains to a new felt shock load reducing harness device which includes break-away sections of strapping to slow the acceleration of a person falling and thereby reduce the probability of injury caused by the harness catching the person.

(2) Description of Related Art Including Information Disclosed Under 37 CFR 1.97 and 1.98

The prior art relates to harnesses used to support a person while positioned on a tree strand. Such devices may incorporate shock felt reduction means but these devices are not placed in the saddle of the harness itself. By positioning such in the saddle, there will be no opportunity for users to not utilize this injury reducing feature.

BRIEF SUMMARY OF THE INVENTION

An embodiment of the disclosure meets the needs presented above by generally comprising a saddle for receiving a buttocks of a person. The saddle has a front side, a rear side, a top edge, a bottom edge, a first lateral edge and a second lateral edge. A pair of bridge connectors is attached to and extends outwardly from the saddle. The bridge connectors are configured to engage a bridge rope. Each of the first and second lateral edges has one of the bridge connectors positioned adjacent thereto. The bridge connectors each form a closed loop with the saddle such that the bridge connectors can engage a bridge rope. The bridge connectors each include a first strap section secured to the saddle and positioned adjacent to the upper edge, a second strap section secured to the saddle and positioned adjacent to the lower edge, and a central strap section attached to and extends between the first and second strap sections. The first strap section includes a plurality folds therein such that an overlapping area of the first strap section is formed. The overlapping area has a break-away fastener extending therethrough that breaks to release the plurality of folds when a predetermined amount of force is placed on the first strap.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
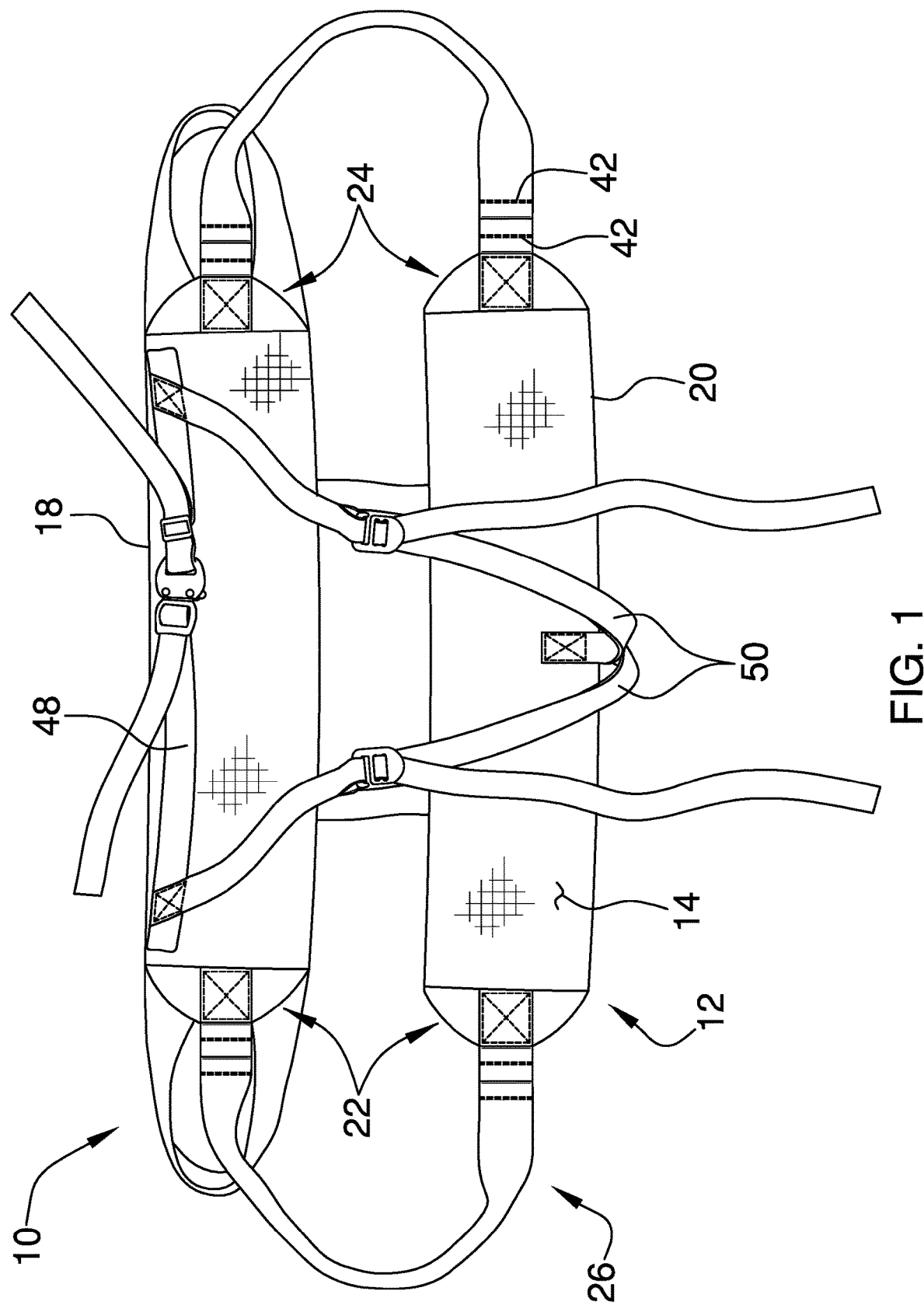
FIG. 1 is a front view of a support harness with shock reducing elements according to an embodiment of the disclosure.
Figure 2:
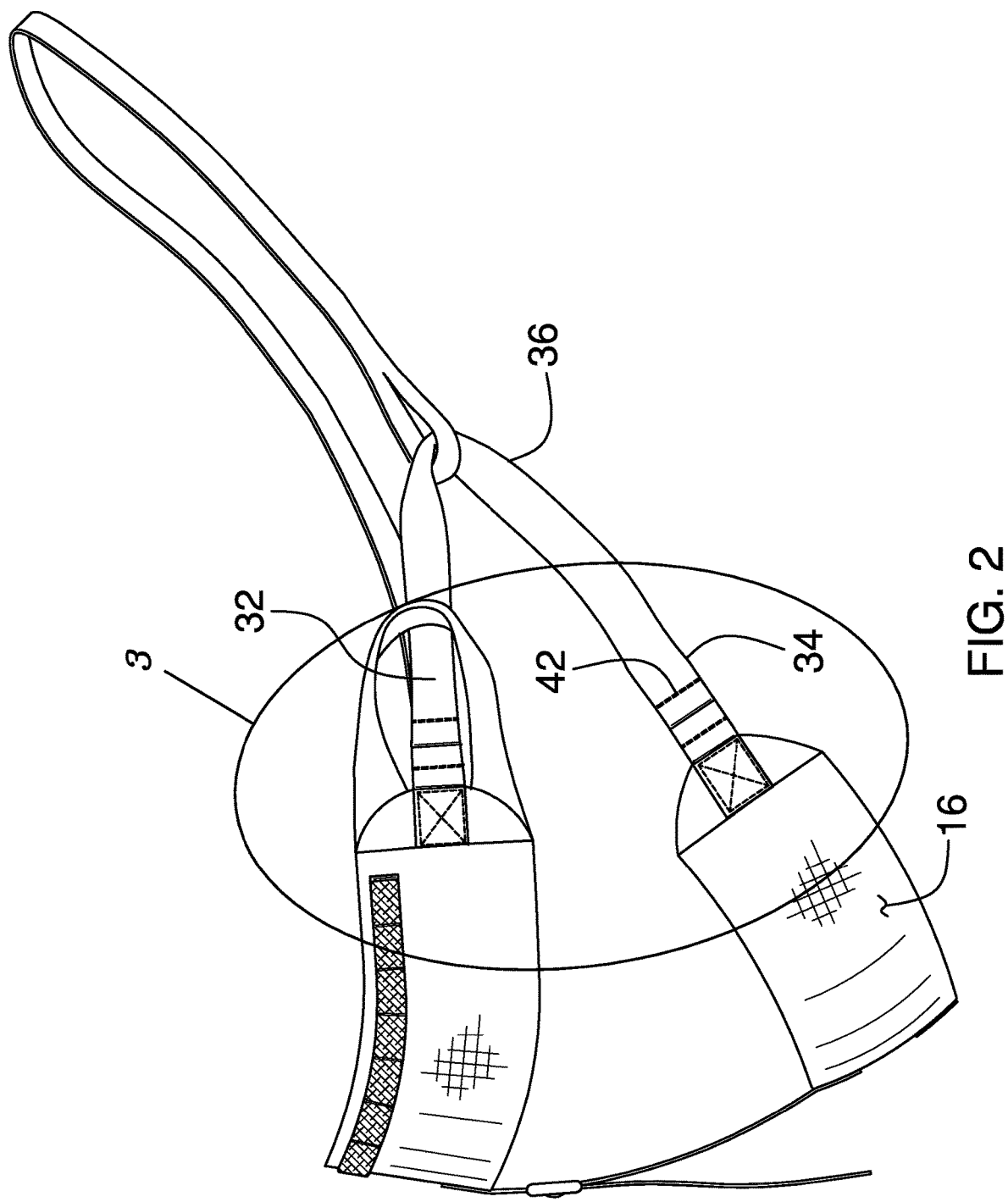
FIG. 2 is a side view of an embodiment of the disclosure.
Figure 3:
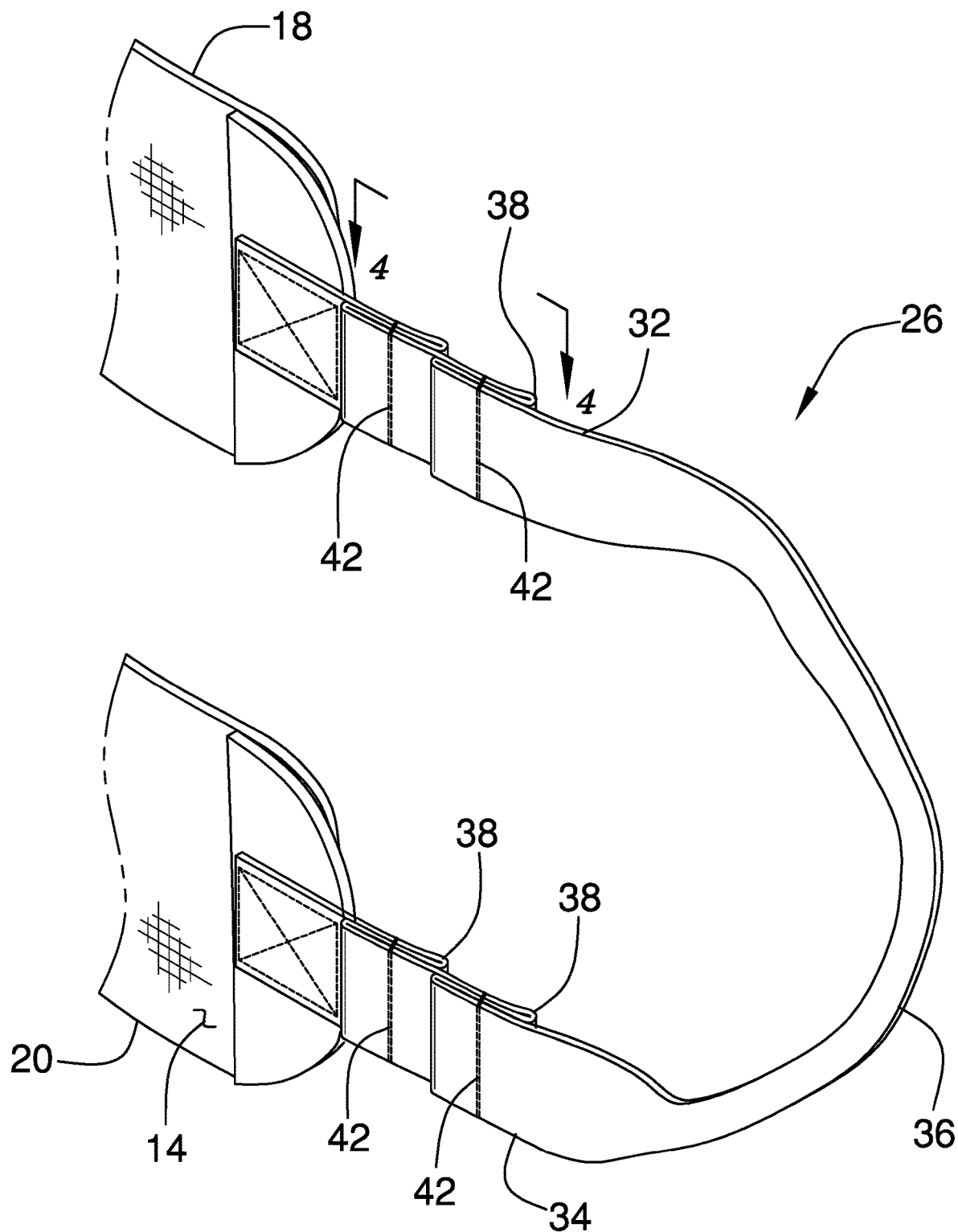
FIG. 3 is a broken, side isometric view of an embodiment of the disclosure, generally taken of the area "3" of FIG. 2.
Figure 4:
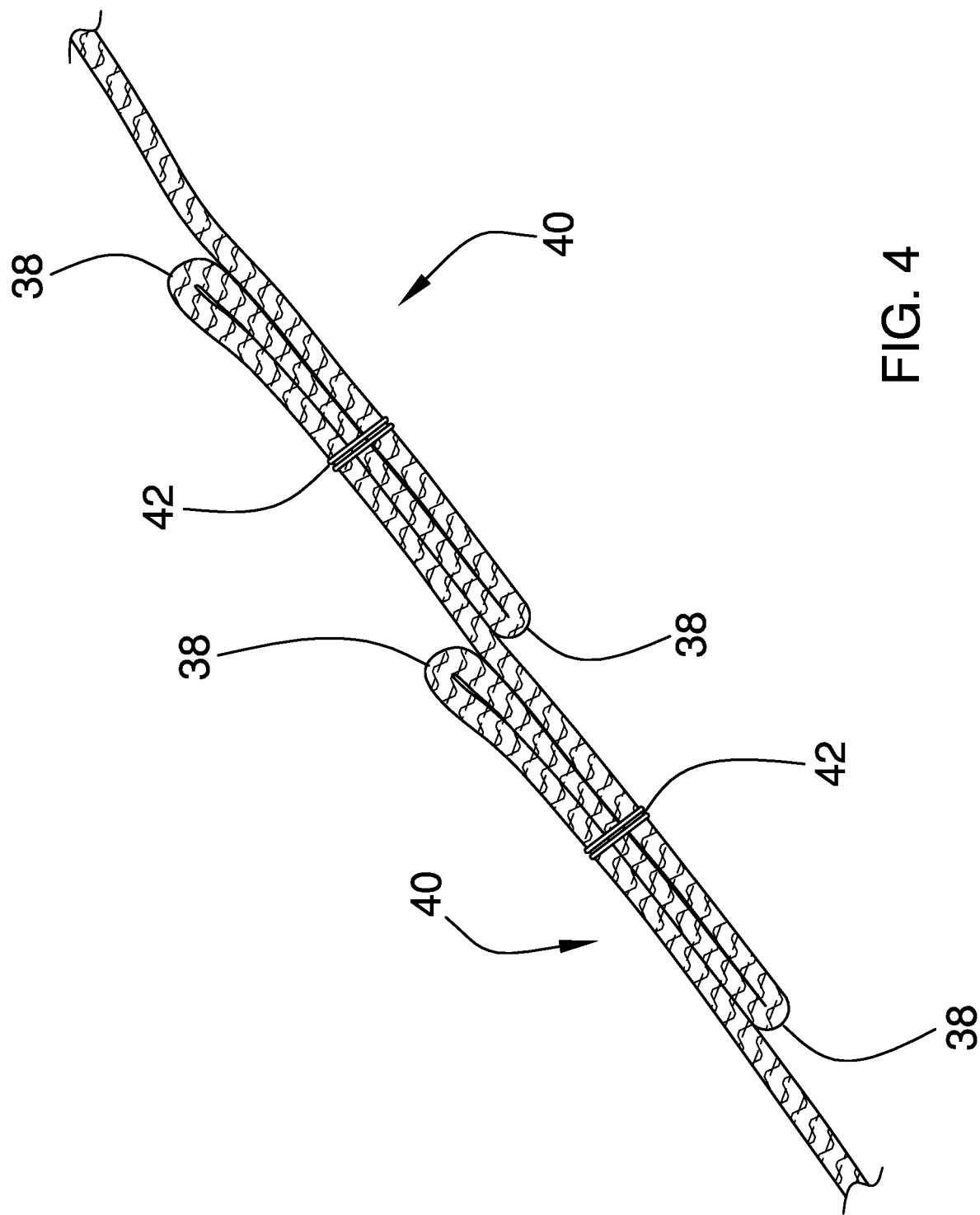
FIG. 4 is a top view of a bridge connector of an embodiment of the disclosure taken along line 4-4 of FIG. 3.
Figure 5:
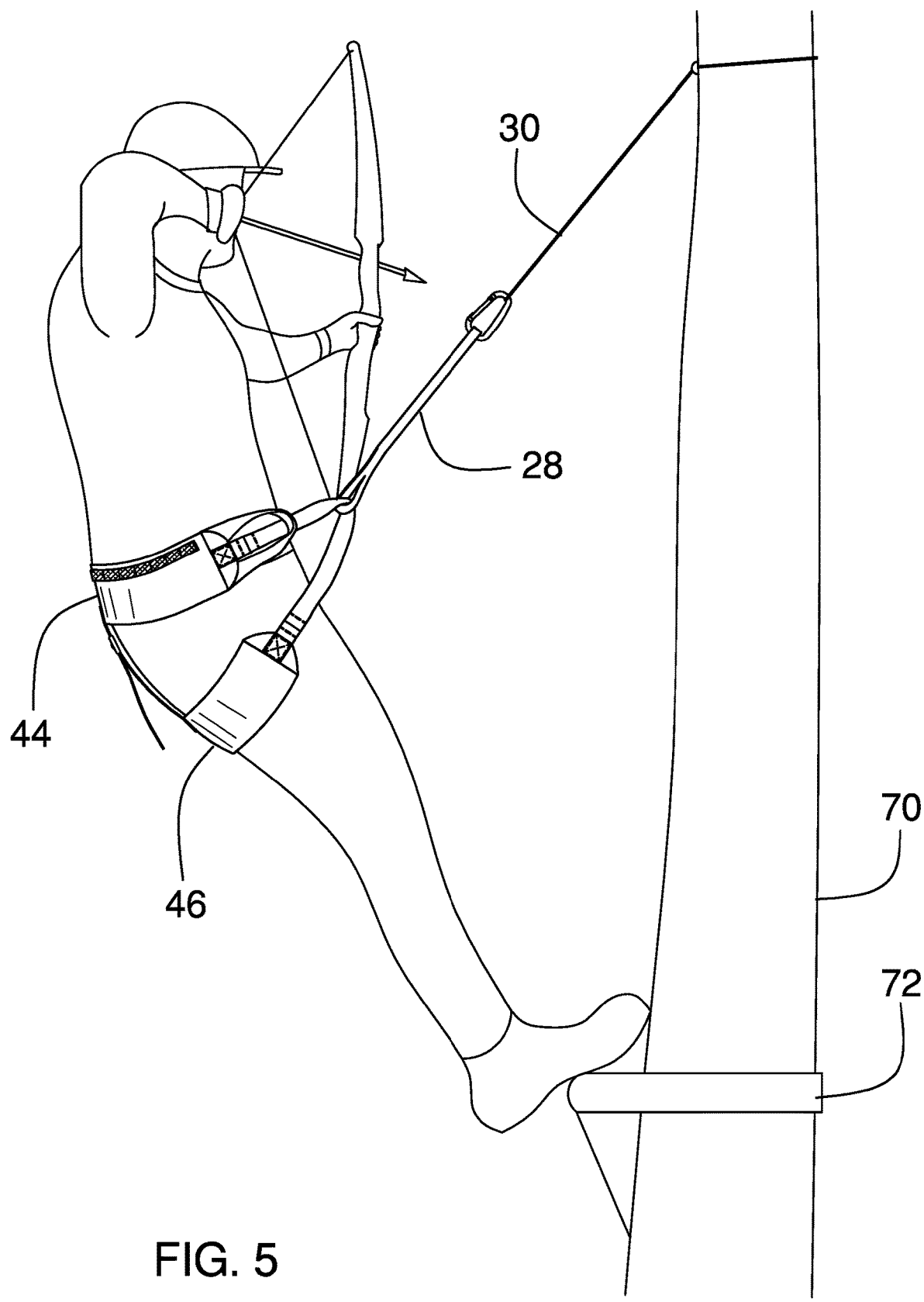
FIG. 5 is side in use of an embodiment of the disclosure.

With reference now to the drawings, and in particular to FIGS. 1 through 5 thereof, a new felt shock load reducing harness device embodying the principles and concepts of an embodiment of the disclosure and generally designated by the reference numeral 10 will be described.

As best illustrated in FIGS. 1 through 5, the support harness with shock reducing elements 10 generally comprises a generally conventional saddle 12 configured for receiving a buttocks of a person. The saddle 12 has a front side 14, a rear side 16, a top edge 18, a bottom edge 20, a first lateral edge 22 and a second lateral edge 24. The saddle 12 may be used, for example, to hold a person while they are supported in a tree 70 and standing on and hunting from a tree stand platform 72. The saddle 12 is secured to the tree and performs the functions of allowing a person to retain their balance while moving about the platform 72 as well as catching the person should the person fall from the platform 72.

A pair of bridge connectors 26 is attached to and extends outwardly from the saddle 12. The bridge connectors 26 are configured to engage a bridge rope 28, which in turn is attached to a tree line 30 secured to a tree 70. The bridge rope 28 is, in turn, attached to the tree 70. Each of the first 22 and second 24 lateral edges has one of the bridge connectors 26 positioned adjacent thereto. The bridge connectors 26 form a closed loop with the saddle 12 such that the bridge connectors 26 are configured to engage the bridge rope 28. The bridge connectors 26 are comprised of conventional materials used for harnesses and may include, for example, straps typically known as webbing made from various plastic and natural materials.

Each of the bridge connectors 26 comprises, more particularly, a first strap section 32 secured to the saddle 12 and positioned adjacent to the upper edge 18, a second strap section 34 secured to the saddle 12 and positioned adjacent to the lower edge 20, and a central strap section 36 attached to and extending between the first 32 and second 34 strap sections.

The first strap section 32 includes a plurality folds 38 therein such that an overlapping area 40 of the first strap section 32 is formed. As can be seen in the Figures, multiple overlapping areas 40 may be formed in the first strap section. The overlapping area 40 has a break-away fastener 42 extending therethrough to retain the overlapping areas in a fixed position. The break-away fastener 42 breaks to release the plurality of folds 38 when a predetermined amount of force is placed on the first strap section 32. The predetermined amount of force may be selected as needed for the specifically required tolerances, but it is preferred that the predetermined amount of force is no greater than 1800 pounds. The length of the first strap section 32 increases as the break-away fasteners 42 break. This length will normally be between 1.0 inches and 12.0 inches for each break-away fastener 42. When a user of the harness falls, the saddle 12 catches the user and the person's body experiences a "felt shock" at the point the bridge rope 28 and bridge connectors 26 are pulled taught on the tree line 30. When the break-away fastener 42 breaks and releases the overlapping areas 40, the "felt shock" is reduced as the acceleration of the user's body is slowed at each breakage of the break-away fasteners 42.

The break away fasteners 42 may include stitching extending through each layer of the first strap section 32 created by the folds 38. The thread may include woven synthetic or natural fibers, for example. Alternatively, plastic tethers may be extended through the overlapping areas 40 to secure the same in place. Non-puncturing alternatives may be potentially be used to adhere together facing sides of the overlapping areas 40. Adhering means may include adhesives or mechanical fusing of the overlapping areas 40 together with heat or friction.

The second strap section 34 may also include a plurality of folds 38 therein such that an overlapping area 40 of the second strap section 32 is formed. The overlapping area 40 of the second strap section has a break-away fastener 42 extending therethrough and breaks to release the plurality of folds 38 therein when a predetermined amount of force is placed on the second strap section. The second strap section 34 may be prepared in an identical manner as the first strap section 32.

The saddle 12 is generally conventional and may be constructed to include an upper cradle 44 and a lower cradle 46. The upper cradle 44 is positioned above the lower cradle 46. Each of the bridge connectors 26 extends between the upper 44 and lower 46 cradles. Additional elements may be utilized by the saddle 12 including, but limited to, a waist belt 48 attached to the front side 14 of the upper cradle 44. Also, a pair of leg straps 50 is attached to and extends between the upper 44 and lower 46 cradles. It should be understood the above describes only one embodiment of the saddle 12 and that the upper cradle 44 and lower cradle 46 may be defined as, respectively, an upper strap and a lower strap wherein fabric is sewn between the top and bottom straps to create an overall cradle.

In use, the saddle 12 is secured to a person to support the person in a tree stand platform 72 while they are hunting. The saddle 12 includes bridge connectors 26 with break away fasteners 42 so that, in the event the person should fall from the tree stand platform 72, the felt shock experienced by the person is lowered to reduce or prevent injuries experienced by the person when their fall is arrested by the saddle 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A safety harness assembly configured to be used by a person while saddle hunting, the safety harness assembly comprising:
   a saddle configured for receiving a buttocks of a person, said saddle having a front side, a rear side, a top edge, a bottom edge, a first lateral edge and a second lateral edge;
   a pair of bridge connectors being attached to and extending outwardly from said saddle, said bridge connectors being configured to engage a bridge rope, each of said first and second lateral edges having one of said bridge connectors positioned adjacent thereto, each of said bridge connectors forming a closed loop with said saddle such that said bridge connectors are configured to engage a bridge rope, each of said bridge connectors comprising:
   a first strap section secured to said saddle and being positioned adjacent to said upper edge;
   a second strap section being secured to said saddle and being positioned adjacent to said lower edge;
   a central strap section being attached to and extending between said first and second strap sections; and
   said first strap section including a plurality folds therein such that an overlapping area of said first strap section is formed having at least three parallel overlapped portions of said first strap section, said overlapping area having a break-away fastener extending through each of said three parallel overlapped portions of said first strap section and breaking to release said plurality of folds when a predetermined amount of force is placed on said first strap section.

2. The safety harness assembly according to claim 1, wherein said second strap section includes a plurality of folds therein such that an overlapping of said second strap section is formed having at least three parallel overlapped portions of said second strap section, said overlapping area of said second strap section having a break-away fastener extending through each of said three parallel overlapped portions of said second strap section and breaking to release said plurality of folds when a predetermined amount of force is placed on said second strap section.

3. The safety harness assembly according to claim 1, wherein said saddle includes an upper cradle and a lower cradle, the upper cradle being positioned above the lower cradle.

4. The safety harness assembly according to claim 3, wherein each of said bridge connectors extends between said upper and lower cradles.

5. The safety harness assembly according to claim 1, further including:
- a waist belt being attached to the upper cradle, the waist belt being attached to the front side of the upper cradle; and
- a pair of leg straps being attached to and extending between the upper and lower cradles.

6. A safety harness assembly configured to be used by a person while saddle hunting, the safety harness assembly comprising:
- a saddle configured for receiving a buttocks of a person, said saddle having a front side, a rear side, a top edge, a bottom edge, a first lateral edge and a second lateral edge;
- a pair of bridge connectors being attached to and extending outwardly from said saddle, said bridge connectors being configured to engage a bridge rope, each of said first and second lateral edges having one of said bridge connectors positioned adjacent thereto, each of said bridge connectors forming a closed loop with said saddle such that said bridge connectors are configured to engage a bridge rope, each of said bridge connectors comprising:
  - a first strap section secured to said saddle and being positioned adjacent to said upper edge;
  - a second strap section being secured to said saddle and being positioned adjacent to said lower edge;
  - a central strap section being attached to and extending between said first and second strap sections;
  - said first strap section including a plurality folds therein such that an overlapping area of said first strap section is formed having at least three parallel overlapped portions of said first strap section, said overlapping area having a break-away fastener extending through each of said three parallel overlapped portions of said first strap section and breaking to release said plurality of folds when a predetermined amount of force is placed on said first strap section, said break-away fastener extending through said overlapping area of said first strap section being centrally positioned between adjacently positioned folds along said first strap of said plurality of folds of said first strap section;
  - said second strap section including a plurality of folds therein such that an overlapping area of said second strap section is formed having at least three parallel overlapped portions of said second strap section, said overlapping area of said second strap section having a break-away fastener extending through each of said three parallel overlapped portions of said second strap section and breaking to release said plurality of folds when a predetermined amount of force is placed on said second strap section, said break-away fastener being linear and extending through said overlapping area of said second strap section parallel to and centrally positioned between adjacently positioned folds along said second strap of said plurality of folds of said second strap section;
- said saddle including an upper cradle and a lower cradle, the upper cradle being positioned above the lower cradle;
- each of said bridge connectors extending between said upper and lower cradles;
- a waist belt being attached to the upper cradle, the waist belt being attached to the front side of the upper cradle; and
- a pair of leg straps being attached to and extending between the upper and lower cradles.

* * * * *